United States Patent [19]

Beriger

[11] 3,725,513
[45] Apr. 3, 1973

[54] PHOSPHORIC ACID ESTERS
[75] Inventor: Ernst Beriger, Neuallschwil, Switzerland
[73] Assignee: Ciba-Geigy AG, Basel, Switzerland
[22] Filed: Apr. 27, 1970
[21] Appl. No.: 32,414

[30] Foreign Application Priority Data
Apr. 28, 1969  Switzerland..................6444/69

[52] U.S. Cl. ............260/951, 260/970, 260/978, 424/217
[51] Int. Cl. ..............................................C07f 9/08
[58] Field of Search..........................260/951, 964

[56] References Cited
FOREIGN PATENTS OR APPLICATIONS
966,057  8/1964  Great Britain.................260/964
922,508  4/1963  Great Britain.................260/964

Primary Examiner—Lewis Gotts
Assistant Examiner—Richard L. Raymond
Attorney—Harry Goldsmith, Joseph G. Kolodny and Mario A. Monaco

[57]  ABSTRACT

Dithiophosphates of the formula

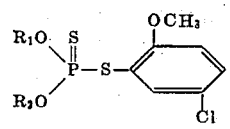

wherein $R_1$ and $R_2$ represent alkyl radicals of up to four carbon atoms are effective pesticidal agents, preferably for combating insects, nematodes and members of the order Acarina. The dithiophosphates may be used in pesticidal preparations.

3 Claims, No Drawings

PHOSPHORIC ACID ESTERS

This invention relates to phosphoric acid esters, processes for their preparation and pesticidal preparations containing them.

The present invention provides new phosphoric acid esters of the formula

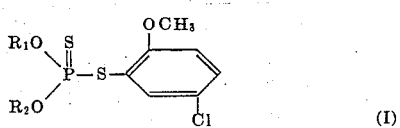

(I)

in which $R_1$ and $R_2$, which may be the same or different, each represents a straight chain or branched alkyl radical having from one to four carbon atoms.

The alkyl radicals represented by $R_1$ and $R_2$ in formula I include the methyl, ethyl, n-propyl, isopropyl, n-butyl, isobutyl and the tert.butyl radicals.

The new phosphoric acid esters of formula I represent highly active substances for combatting insects in the broadest sense and pests of the order Acarina, including all their stages of development such as eggs, larvae and chrysales or pupae.

The compounds of formula I can, for example, be used against all harmful insects, for example against aphids such as the green peach aphid (*Myzus persicae*), the bean aphid (*Doralis fabae*); shield lice such as *Aspidiotus hederae, Lecanium hesperidium, Pseudococcus maritimus;* thysanoptera such as Hercinothrips femoralis, and bugs such as the beet bug (*Piesma quadrata*) or the bed bug (*Cimex lectularius*), butterfly caterpillars, such as *Plutella maculipennis* and *Lymantira dispar;* beetles such as the granary weevil (*Calandra granaria*) or Colorado beetle (*Leptinotarsa decemlineata*); but also soil-inhabiting varieties, such as wire worms (*Agriotes sp.*) or cockchafer grubs (*Melolontha melolontha*); orthoptera, such as the German cockroach (*Blattella germanica*) and the cricket (*Gryllus domesticus*); termites, such as Reticulitermes; hymenoptera such as ants; diptera, such as the vinegar fly (*Drosophila melanogaster*), the Mediterranean fruit fly (*Ceratitis capitata*) and the housefly (*Musca domestica*), and also gnats (for example *Aedes aegypti* and *Anopheles stephensi*).

The compounds of the formula I are also especially effective for combatting representatives of the order Acarina such as, for example, Eulaelaps, Echinolaelaps, Laelaps, Haemogamasus, Dermanyssus, Ornithonyssus, and Allodermanyssus, especially *Allodermanyssus sanguineus*, Pneumonyssus, Amblyomma, Aponomma, Boophilus, Dermancentor, Haemophysalis, Hyalomma, Ixodidae, Margaropus, Rhipicephalus, Ornithodorus; Otobius, Cheyletidea, for example, Cheyletus, Psorergates, Demodicidae, Trombiculidae, for example, Trombicula, Eutrombicula, Schöngastia, Acomatacurus, Neoschöngastia, Euschöngastia, Sarcoptiformes, for example, Notoedres, Sarcoptes, Knemidokoptes, Psoroptidae, for example, Psoroptes, Chorioptes, Otodectes or Tetranychidae, for example, Tetranychus telarius or Tetranychus urticae.

The phosphoric acid esters of formula I are also active against phytopathogenic nematodes, such as Aphelenchoides, for example *A. ritzemabosi, A. fragariae,* and *A. oryzae,* varieties of *Ditylenchus* such as *D. Dipsaci,* varieties of Meloidogyne such as *M. arenaria* and *M. incognita* and varieties of Heterodera such as *H. rostochiensis* and *H. schachtii,* and also varieties such as Paratylenchus, Rotylenchus, Xiphinema and Radopholus.

A fungitoxic and bacteriostatic action has also been observed, for the compounds of the present invention.

Good to very good fungicidal action has been found on the following species: *Alternaria tenuis, Botrytis cinerea, Clasterosporium c.; Conoithrium dipl., Fusarium culm., Mucor spec., Penicilium spec., Stemphylium cons., Botrytis fabae.*

The present invention therefore also provides biocidal preparations, especially insecticidal and acaricidal preparations, which comprise, as active ingredient, at least one phosphoric acid ester of the general formula I, and, if desired, one or more appropriate carriers, for example, solvents, dispersing agents, wetting agents, adhesives, thickeners and, under certain circumstances, further pesticides.

If the pure active substances are applied as a smoke, spray, mist or the like, their biocidal action manifests itself within an extremely short time in the case of, for example, midges, whilst in the case of other insects, somewhat longer times, (up to about 1 hour) are found necessary until the action manifests itself.

The ovicidal activity of the compounds of formula I was investigated on the eggs of meal moths, cotton bugs, polyvalent-resistant and normally sensitive houseflies, gnats and Colorado beetles. Freshly laid eggs were brought into contact with the active substance in the form of an emulsion. The active substances to be used according to the invention show a good ovicidal activity up to high dilutions, that is to say to about 0.01 percent relative to the active substance.

The acaricidal activity of the compound of formula I was tested on mites. A good action was found on tarsal contact.

The agents which contain the active substances of formula I can be applied in the most diverse manner, mainly in the form of aqueous sprays, dusting powders or granules.

Aqueous sprays can for example be produced on the basis of an emulsifiable concentrate or a wettable powder. A suitable emulsifiable concentrate can, for example, be manufactured from about 25 parts of a compound of formula I, 40–50 parts of diacetone-alcohol or isophorone, 20–30 parts of an aromatic petroleum product, xylene, toluene or some other mixture of such solvents, and 2–10 parts of one or more emulsifying agents. It is also possible to use small amounts of an agent which assists the formation of a homogeneous solution, such as methanol, methoxymethanol or butoxymethanol.

A suitable emulsifier can for example be manufactured from 1–1.5 parts of calcium or sodium dodecylbenzenesulphonate, 2.5–4 parts of an octyl- or nonyl-phenoxypolyethoxy-ethanol, as well as about 0.5–1 part of methanol and 0–0.8 part of xylene. The resulting mixture is added to the solvents and to the active substance of formula I in the quantity ratio indicated above. It is however also possible to use one or more other surface-active agents.

Depending on its appropriateness, an anionic, cationic or ionic emulsifier soluble in solvents can be used. Instead of the abovementioned non-ionic agent derived from an alkylphenol and ethylene oxide, it is also possible to employ ethylene condensates of long-chain alcohols, carboxylic acids, phenols or amines. Non-ionic concentrates of polyglycerines and fatty acids or of polyglycerines and a resin-forming acid such as phthalic acid can also be used in the manufacture of self-emulsifying preparations. Typical anionic agents are those based on alcohol sulphonates, alcohol sulphates or alcohol sulphosuccinates. Cationic surface-active substances soluble in solvents are, for example, oleyl-benzyldimethylammonium chloride, or dodecyl-benzyl-trimethylammonium chloride or bromide. For this it may be seen that the character of the emulsifier is in detail of no special significance, provided that it is soluble in the solution of the active substance in one or in several inert solvents.

A wettable powder can be obtained if an active substance of formula I is taken up in a volatile solvent such as for example acetone, brought together with a finely divided solid such as kaolin, pyrophyllite or diatomaceous earth, and the solvent evaporated. The powder is heated with small amounts of one or more wetting agents or dispersing agents. A typical composition for example consists of 20 parts of an active substance of formula I, 77.5 parts of one or more finely divided solids, 0.5 part of wetting agent, such as an octylphenoxy-polyethoxy-ethanol and 2 parts of the sodium salt of methylene-bis-naphthalenedisulphonic acid.

Dusts containing 5–10 percent of the active agent can be manufactured by diluting such a wettable powder with a finely divided solid carrier. Wetting agents or dispersing agents can optionally be added.

Granules, such as are, say, used for combatting soil pests, are for example obtainable by dissolving an active substance of formula (I) in an organic solvent, applying the solution thus obtained to a granular mineral, for example attapulgite, $SiO_2$, granicalcium, bentonite and the like, and then again evaporating the organic solvent.

It is also possible to use polymer granules. They can be manufactured by mixing the active substances of formula I with polymerizable compounds (urea/formaldehyde, dicyandiamide/formaldehyde, melamine/formaldehyde or others), after which a mild polymerization is carried out which leaves the active substances unaffected, with the granulation being carried out whilst the gel formation is still proceeding. A more advantageous method is to impregnate finished, porous polymer granules (urea/formaldehyde, polyacrylonitrile, polyesters or others) having a certain surface area and an advantageous pre-determinable adsorption/ desorption ratio with the active substances, for example in the form of their solutions (in a low0boiling solvent) and to remove the solvent.

Such polymer granules, in the form of microgranules with bulk densities of, preferably, 300 g/liter to 600 g/liter, can also be applied by means of sprays. The spraying can be carried out over crops covering a large area with the aid of aircraft.

Of course further pesticides, fertilizers, surface-active agents or substances for increasing the specific gravity, such as $BaSO_4$, can be added to the granules.

Granules are also obtainable compacting the carrier material with the active substances and additives and subsequent comminution.

In general, the pesticides according to the invention contain between 0.1 and 20 percent by weight of active substance of formula I in the case of more dilute agents, and between 20 and 98 percent by weight where concentrated agents are intended.

The action of the dithiophosphates according to the invention can be further increased by synergistic agents. Suitable materials for this purpose are, for example, Sesamine, Sesamex, piperonyl-cyclonene, piperonyl-butoxide, piperonal-bis[2-(2-butoxyethoxy)ethyl]acetate, sulphoxide, propylisome , N-(2-ethylhexyl)-5-norbornene-2,3-dicarboxamide, octachlorodipropyl-ether, 2-nitrophenylpropargyl-ether, 4-chloro-2-nitrophenyl-propargyl-ether and 2,4,5-trichlorophenyl-propargyl-ether.

The compounds of formula I can be combined with further insecticidal, acaricidal and/or nematocidal active substances for broadening the use spectrum. A series of examples are given below.

PHOSPHORIC ACID DERIVATIVES

Bis-o,o-diethylphosphoric acid anhydride (TEPP)
O,O,O,O-Tetrapropyldithiopyrophosphate
Dimethyl(2,2,2-trichloro-1-hydroxyethyl)phosphonate (TRICHRORFON)
1,2-Dibromo-2,2-dichloroethyldimethylphosphate (NALED)
2,2-Dichlorovinyldimethylphosphate (DICHLORFOS)
2-Methoxycarbamyl-1-methylvinyl-dimethylphosphate (MEVINPHOS)
Dimethyl-1-methyl-2-(methylcarbamoyl)vinylphosphate cis (MONOCROTOPHOS)
3-(Dimethoxyphosphinyloxy)-N-methyl-N-methoxy-cis-crotonamide
3-(Dimethoxyphosphinyloxy)-N,N-dimethyl-cis-crotonamide (DICROTOPHOS)
2-Chloro-2-diethylcarbamoyl-1-methylvinyl-dimethylphosphate (PHOSPHAMIDON)
O,O-Diethyl-O(or S)-2-(ethylthio)-ethylthiophosphate (DEMETON)
S-Ethylthioethyl-O,O-dimethyl-dithiophosphate (THIOMETON)
O,O-Diethyl-S-ethylmercaptomethyldithiophosphate (PHORATE)
O,O-Diethyl-S-2-[(ethylthio)ethyl]dithiophosphate (DISULFOTON)
O,O-Dimethyl-S-2 (ethylsulphinyl ethylthiophosphate (OXYDEMETONMETHYL)
O,O-Dimethyl-S-(1,2 dicarbethoxyethyl dithiophosphate (MALATHION)
(O,O,O,O-Tetraethyl S,S'-methylene-bis-[ithiophosphate] (ETHION)
O-Ethyl-S,S-dipropyldithiophosphate
O,O-Dimethyl-S-(N methyl-N-formylcarbamoylmethy)-dithiophosphate (FORMOTION)
O,O-Dimethyl-S-(N methylcarbamoylmethyl dithiophosphate (DIMETHAT)
O,O-Dimethyl-S-(N ethylcarbamoylmethyl dithiophosohate (ETHOATMETHYL)
O,O-Diethyl-S-(N isopropylcarbamoylmethyl) dithiophosphate (PROTHOAT)

S - N - (1 - Cyano - 1 - methylethyl)carbamoylmethyl - diethylthiolphosphate (CYANTHOAT)

S - (2 - Acetamidoethyl) - O, O - dimethyldithio - phosphate Hexamethylphosphoric acid triamide (HEMPA)

O, O - Dimethyl - O - p - nitrophenylthiophosphate (PARATHION-METHYL)

O, O - Diethyl - O - p - nitrophenylthiophosphate (PARATHION)

O - Ethyl - O - p - nitrophenylthiophosphonate (EPN)

O, O - Dimethyl - O - (4 - nitro - m - tolyl)thiophosphate (FENITROTHION)

O, O - Dimethyl - O - (2 - chloro - 4 - nitrophenyl)thiophosphate (DICAPTHON)

O, O - Dimethyl - O - p - cyanophenylthiophosphate (CYANOX)

O - Ethyl - O - p - cyanophenylphenylthiophosphonate

O, O - Diethyl - O - 2, 4 - dichlorophenylthiophosphate (DICHROFENTHION)

O - 2, 4 - Dichlorophenyl - O - methylisopropyl - amidothiophosphate

O, O - Dimethyl - O - 2, 4, 5 - trichlorophenylthiophosphate (RONNEL)

O - Ethyl - O - 2, 4, 5 - trichlorophenylethylthiophosphonate (TRICHLORONAT)

O, O - Dimethyl - O - 2, 5 - dichloro - 4 - bromophenyl-thiophosphate (BROMOPHOS)

O, O - Diethyl - O - 2, 5 - dichloro - 4 - bromophenyl - thiophosphate (BROMOPHOS-ETHYL)

O, O - Dimethyl - O - (2, 5 - dichlor - 4 - iodophenyl) - thiophosphate (IODOFENPHOS)

4 - tert. Butyl - 2 - chlorophenyl - N - methyl - O - methylamidophosphate (CRUFOMAT)

Dimethyl - p - (methylthio)phenylphosphate

O, O - Dimethyl - O - (3 - methyl - 4 - methylmercapto-phenyl)thiophosphate (FENTHION)

Isopropylamino - O - ethyl - O - (4 - Methylmercapto - 3-methylphenyl)-phosphate O, O - Diethyl - O - p - [(methylsulphinyl)phenyl] - thiophosphate (FENSULFOTHION)

O, O - Dimethyl - O - p - sulphamidophenylthiophosphate

O - [p - (Dimethylsulphamido)phenyl]O, O - dimethyl - thiophosphate (FAMPHUR)

O, O, O', O' - Tetramethyl - O, O' - thiodi - p - phenylenethiophosphate

O - (p - (p - Chlorophenylazophenyl)O, O - dimethyl - thiophosphate (AZOTHOAT)

O - Ethyl - S - phenyl - ethyldithiophosphonate

O - Ethyl - S - 4 - chlorophenyl - ethyldithiophosphonate

O - Isobutyl - S - p - chlorophenyl - ethyldithiophosphonate

O, O - Dimethyl - S - p - chlorophenylthiophosphonate

O, O - Dimethyl - S - (p - chlorophenylthiomethyl) - dithiophosphate

O, O - Diethyl - p - chlorophenylmercaptomethyl - dithiophosphate (CARBOPHENOTHION)

O, O - Diethyl - S - p - chlorophenylthiomethyl - thiophosphate

O, O - Dimethyl - S - (carbethoxy - phenylmethyl) dithiophosphate (PHENOTHOAT)

O, O - Diethyl - S - (carbofluorethoxy - phenylmethyl)-dithiophosphate

O, O - Dimethyl - S - (carbisopropoxy - phenylmethyl) - dithiophosphate

O, O - Dimethyl - O - (alpha - methylbenzyl - 3 - hydroxycrotonyl)phosphate,

2 - Chloro - 1 - (2, 4 - dichlorophenyl)vinyl - diethyl - phosphate (CHLORFENVINPHOS)

2 - Chloro - 1 - (2, 4, 5 - trichlorophenyl)vinyl - dimethylphosphate

O - (2 - Chloro - 1 - (2, 5 - dichlorophenyl)vinyl - O, O - diethylthiophosphate Phenylglyoxylonitriloxime - O, O - diethylthiophosphate (PHOXIM)

O, O - Diethyl - O - (3 - chloro - 4 - methyl - 2 - oxo - 2 - H - 1 - benzopyran - 7 - yl) - thiophosphate (COUMAPHOS)

O, O - Diethyl - 7 - hydroxy - 3, 4 - tetramethylene - coumarinyl - thiophosphate (COUMITHOAT)

2, 3 - p - Dioxanedithiol - S, S - bis(O, O - diethyl - dithiophosphate) (DIOXATHION)

2 - Methoxy - 4 - H - 1, 3, 2 - benzodioxaphosphorine - 2 - sulphide

O, O - Diethyl - O - (5 - phenyl - 3 - isooxyzolyl (sic)) thiosphosphate

S - [(6 - Chlor - 2 - oxo - 3 - benzoxazolinyl)methyl] O, O - diethyldithiophosphate (PHOSALON)

2 - (Diethoxyphosphinylimino) - 4 - methyl - 2, 3 - dithiolane

O, O - Dimethyl - S - [2 - methoxy - 1, 3, 4 - thiadiazol - 5 - (4H) - onyl - (4) - methyl]dithiophosphate Tris - (2 - methyl - 1 - aziridinyl) - phosphine - oxide (METEPA)

O, O - Dimethyl - S - phthalimidomethyl - dithiophosphate

S - (2 - Chloro - 1 - phthalimidoethyl) - O, O - diethyl - dithiophosphate

N - Hydroxynaphtalimido - diethylphosphate

Dimethyl - 3, 5, 6 - trichloro - 2 - pyridylphosphate

O, O - Dimethyl - O - (3, 5, 6 - trichloro - 2 - pyridyl) thiophosphate

O, O - Diethyl - O - (3, 5, 6 - trichloro - 2 - pyridyl) thiophosphate

O, O - Diethyl - O - 2 - pyrazinylthiophosphate (THIONAZIN)

O, O - Diethyl - O - (2 - isopropyl - 4 - methyl - 6 - pyrimidyl)thiophosphate (DIAZINON)

O, O - Diethyl - O - (2 - quinoxylyl)thiophosphate

O, O - Dimethyl - S - (4 - oxo - 1, 2, 3 - benzotriazin - 3(4H) - ylmethyl) - dithiophosphate (AZINPHOS-METHYL)

O, O - Diethyl - S - (4 - oxo - 1, 2, 3 - benzotriazin - 3(4H) - ylmethyl) - dithiophosphate (AZINPHOS - ETHYL)

S - [(4, 6 - Diamino - s - triazin - 2 - yl)methyl] - O, O - dimethyldithiophosphate (MENAZON)

S - [2 - (Ethylsulphonyl)ethyl]dimethylthiolphosphate (DIOXYDEMETON - S - METHYL)

Diethyl - S - [2 - (ethylsulphinyl)ethyl]dithiophosphate (OXYDISULFOTON)

Bis - O, O - diethylthiophosphoric acid anhydride (SULFOTEP)

Dimethyl - 1, 3 - di(carbomethoxy) - 1 - propen - 2 - yl - phosphate

Dimethyl - (2, 2, 2 - trichloro - 1 - butyroyloxyethyl) phosphonate (BUTONAT)

O, O - Dimethyl - O - (2, 2 - dichloro - 1 - methoxy - vinyl)phosphate

O, O - Dimethyl - O - (3 - chloro - 4 - nitrophenyl) thiophosphate (CHLORTHION)

O, O - Dimethyl - O(or S) - 2 - (ethylthioethyl)thiophosphate (DEMETON-S-METHYL)

Bis - (dimethylamido)fluorophosphate (DIMEFOX)

2 - (O, O - Dimethyl - phosphoryl - thiomethyl) - 5 - methoxy - pyrone - 4

3, 4 - Dichlorobenzyl - triphenylphosphonium chloride

Dimethyl - N - methoxymethylcarbamoylmethyl - dithiophosphate (FORMOCARBAM)

O, O - Diethyl - O - (2, 2 - dichloro - 1 - chlorethoxyvinyl)phosphate

O, O - Dimethyl - O - (2, 2 - dichloro - 1 - chlorethoxyvinyl)phosphate

O - Ethyl - S, S - diphenyldithiolphosphate

O - Ethyl - S - benzyl - phenyldithiophosphonate

O, O - Diethyl - S - benzyl - thiolphosphate

O, O - Dimethyl - S - (4 - chlorophenylthiomethyl) dithiophosphate (METHYLCARBOPHENOTHION)

O, O - Dimethyl - S - (ethylthiomethyl)dithiophosphate

Diisopropylaminofluorophosphate (MIPAFOX)

O, O - Dimethyl - S - (morpholinylcarbamoylmethyl) dithiophosphate (MORPHOTHION)

Bismethylamido - phenylphosphate

O, O - Dimethyl - S - (benzenesulphonyl)dithiophosphate

O, O - Dimethyl - (S and O) - ethylsulphinylethyl - thiophosphate

O, O - Diethyl - O - 4 - nitrophenylphosphate

O, O - Diethyl - S - (2, 5 - dichlorophenylthiomethyl) dithiophosphate (PHENDAPTON)

Triethoxy - isopropoxy - bis (thiophosphinyl)disulphide

O, O - Diethyl - O - (4 - methyl - coumarinyl - 7) - thiophosphate (POTASAN)

2 - Methoxy - 4H - 1, 3, 2 - benzodioxaphosphorine - 2 - oxide

Octamethylpyrophosphoramide (SCHRADAN)

Bis ( dimethoxythiophosphinylsulphido ) - phenyl - methane

5 - Anino - bis(dimethylamido)phosphinyl - 3 - phenyl - 1, 2, 4 - triazole (TRIAMIPHOS)

N - Methyl - 5 - (O, O - dimethylthiolphosphoryl) - 3 - thiavaleramide (VAMIDOTHION) and N, N, N', N' - Tetramethyldiamidofluorophosphate (DIMEFOX)

CARBAMIC ACID DERIVATIVES

1-Naphthyl-N-methylcarbamate (CARBARYL)
2-Butinyl-4-chlorophenylcarbamate
4-Dimethylamino-3,5-xylyl-N-methylcarbamate
4 - Dimethylamino - 3 - tolyl - N - methylcarbamate (AMINOCARB)
4 - Methylthio - 3, 5 - xylyl - N - methylcarbamate (METHIOCARB)
3, 4, 5 - Trimethylphenyl - N - methylcarbamate
2-Chlorophenyl-N-methylcarbamate (CPMC)
5 - Chlor - 6 - oxo - 2 - norbornane - carbonitrile - O - (methylcarbamoyl)-oxime
1 - (Dimethylcarbamoyl) - 5 - methyl - 3 - pyrazolyl - N,N-dimethylcarbamate (DIMETILAN)

2, 3 - Dihydro - 2, 2, - dimethyl - 7 - benzofuranyl - N - methylcarbamate (CARBOFURAN)

2 - Methyl - 2 - methylthio - propionaldehyde - O - (methylcarbamoyl) - oxime (ALDICARB)

8 - Quinaldyl - N - methylcarbamate and its salts

Methyl 2 - isopropyl - 4 - (methylcarbamoyloxy) carbanilate m - (1 - Ethylpropyl)phenyl - N - methylcarbamate
3,5-Di-tert. Butyl-N-methylcarbamate
m - (1 - Methylbutyl)phenyl - N - methylcarbamate
2-Isopropylphenyl-N-methylcarbamate
2-sec Butylphenyl-N-methylcarbamate
m-Tolyl-N-methylcarbamate
2,3-Xylyl-N-methylcarbamate
3-Isopropylphenyl-N-methylcarbamate
3-tert. Butylphenyl-N-methylcarbamate
3-sec.-Butylphenyl-N-methylcarbamate 3 - Isopropyl - 5 - methylphenyl - N - methylcarbamate (PROMECARB)

3,5-Diisopropylphenyl-N-methylcarbamate
2-Chlor-5-isopropylphenyl-N-methylcarbamate
2-Chlor-4,5-dimethylphenyl-N-methylcarbamate 2 - (1, 3 - Dioxolan - 2 - yl)phenyl - N - methylcarbamate (DIOXYCARB)

2 - (4, 5 - Dimethyl - 1, 3 - dioxolan - 2 - yl)phenyl - N-methylcarbamate

2 - (1, 3 - Dioxan - 2 - yl)phenyl - N - methylcarbamate

2 - (1, 3 - Dithiolan - 2 - yl)phenyl - N - methyl - carbamate

2 - (1, 3 - Dithiolan - 2 - yl)phenyl - N, N - dimethyl - carbamate

2 - Isopropoxyphenyl - N - methylcarbamate (ARPROCARB)

2 - (2 - Propinyloxy)phenyl - N - methylcarbamate
2 - (2 - Propinyloxy)phenyl - N - methylcarbamate
3 - (2 - Propinyloxy)phenyl - N - methylcarbamate
2 - Dimethylaminophenyl - N - methylcarbamate
2 - Diallylaminophenyl - N - methylcarbamate
4 - Diallylamino - 3, 5 - xylyl - N - methylcarbamate (ALLYXICARB)
4-Benzothienyl-N-methylcarbamate 2, 3 - Dihydro - 2 - methyl - 7 - benzofuranyl - N - methylcarbamate 3 - Methyl - 1 - phenylpyrazol - 5 - yl - N, N - di - methylcarbamate 1 - Isopropyl - 3 - methylpyrazol - 5 - yl - N, N - di - methylcarbamate (ISOLAN)

2 - (N', N' - Dimethylcarbamoyl) - 3 - methylpyrazol - 5-yl-N,N-dimethylcarbamate 2 - Dimethylamino - 5, 6 - dimethylpyrimidin - 4 - yl - N,N-dimethylcarbamate 3 - Methyl - 4 - dimethylaminomethyleneiminophenyl- N-methylcarbamate 3 - Dimethylamino - methyleneiminophenyl - N - methylcarbamate 1 - Methylthio - ethylimino - N - methylcarbamate (METHOXYMYL)

2-Methylcarbamoyloxyimino-1,3-dithiolane

5 - Methyl - 2 - methylcarbamoyloxyimino - 1, 3 - oxathiolane

2 - (1 - Methoxy - 2 - propoxy)phenyl - N - methylcarbamate

2 - (1 - Butin - 3 - yl - oxy)phenyl - N - methylcarbamate

3 - Methyl - 4 - (dimethylamino - methylmercapto - methyleneimino)phenyl-N-methylcarbamate 1, 3 - Bis(carbamoylthio) - 2 - (N, N - dimethylamino) - propane hydrochloride
5,5-Dimethylhydroresorcinoldimethylcarbamate
2 - [Propargylethylamino] - phenyl - N - methylcarbamate
2 - [Propargylmethylamino] - phenyl - N - methylcarbamate
2-[Dipropargylamino]-phenyl-N-methylcarbamate
3 - Methyl - 4 - [dipropargylamino] - phenyl - N - methylcarbamate
3, 5 - Dimethyl - 4 - [dipropargylamino] - phenyl - N - methylcarbamate
2 - [Allyl - isopropylamino] - phenyl - N - methylcarbamate and
3 - [Allyl - isopropylamino] - phenyl - N - methylcarbamate.

CHLORINATED HYDROCARBONS

γ-Hexachlorocyclohexane [Gammexane; Lindane; γ HCH]
1, 2, 4, 5, 6, 7, 8, 8-Octachloro-3α, 4, 7, 7α'-tetrahydro-4,7-methyleneindane [Chlordan]
1, 4, 5, 6, 7, 8, 8-Heptachloro-3α, 4, 7, 7α-tetrahydro-4,7-methyleneindane [Heptachlor]
1, 2, 3, 4, 10, 10-Hexachloro-1, 4, 4α, 5, 8, 8α-hexahydro-endo-1, 4-exo-5, 8-dimethanonaphthalene [Aldrin]
1, 2, 3, 4, 10, 10-Hexachlor-6, 7-epoxy-1, 4, 4α, 5, 6, 7, 8, 8α, 9-octahydro-exo-1, 4-endo-5, 8-dimethanonaphthalene [Dieldrin] ditto, endo-endo- [Endrin]
6, 7, 8, 9, 10, 10-Hexachloro-1, 5, 5α, 6, 9, 9α-hexahydro-6, 9-methano-2, 3, 4 benzo[e]-dioxa-thiepene-3-oxide [Endosulfan]
Chlorinated camphor [Toxaphen]
Decachloroctahydro-1, 3, 4-metheno-2H-cyclobuta[e d]pentalen-2-one
Dodecachloroctahydro-1, 3, 4-metheno-1H-cyclobuta[c d]pentalene [Mirex]
Ethyl-1,1α, 3, 3α, 4, 5, 5α, 5α, 6-decachloroctahydro-2-hydroxy-1, 3, 4-metheno-1H-cyclobuta[c d]pentalene-2-laevulinate
Bis(pentachloro-2,4-cyclopentadien-1-yl)
Dinoctone-o
1,1-Trichloro-2,2-bis(p-chlorophenyl)ether [DDT]
Dichlorodiphenyl-dichlorethane [TDE]
Di(p - chlorophenyl) - trichloromethylcarbinol [Dicofol]
Ethyl-4, 4'-dichlorophenylglycollate [Chlorobenzylate]
Ethyl-4,4'-dibromobenzylate [Bromobenzylate]
Isopropyl-4,4'-dichlorobenzylate
1, 1, 1-Trichloro-2, 2 bis(p-methoxyphenyl)ethane [Methoxychlor]
Diethyl-diphenyl-dichlorethane
Decachloropentacyclo(3, 3', 2, $O^{2,6}$, $O^{3,9}$, $O^{7,10}$)decan-4-one [Chlordecon].

NITROPHENOLS AND DERIVATIVES 4,6-Dinitro-6-methylphenol Na salt [dinitrocresol]
Dinitrobutylphenol-2,2',2''-triethanolamine salt
2-Cyclohexyl-4,6-dinitrophenol [Dinex]
2-(1-Methylheptyl)-4, 6-dinitrophenyl-crotonate [Dinocap]

2 sec.-Butyl-4, 6-dinitrophenyl-3-methyl-butenoate [Binapacryl]
2 sec. - Butyl - 4, 6 - dinitrophenyl - cyclopropionate and
2 sec. - Butyl - 4, 6 - dinitrophenyl - isopropyl - carbonate [Dinobuton]

VARIOUS SUBSTANCES

Sabadilla
Rotenon
Cevadin
Veratridin
Ryania
Pyrethrin
3 - Allyl - 2 - methyl - 4 - oxo - 2 - cyclopenten - 1 - yl - chrysanthemumate (Allethrin)
6 - Chloropiperonyl - chrysanthemumate (Barthrin)
2, 4 - Dimethylbenzyl - chrysanthemumate (Dimethrin)
2, 3, 4, 5 - Tetrahydrophthalimidomethyl - chrysanthemumate
(5 - Benzyl - 3 - furyl) - methyl - 2, 2 - dimethyl - 3 - (2 - methylpropanyl) cyclopropanecarboxylate
Nicotine
Bacillus thuringiensis Berliner
Dicyclohexylcarbodiimide
Diphenyldiimide [azobenzene]
4 - Chlorobenzyl - 4 - chlorophenylsulphide [Chlorbensid]
Creosote oil
6 - Methyl - 2 - oxo - 1, 3 - dithiolo - [4, 5 - b] - quinoxaline [Quinomethionat]
(I) - 3 - (2 - Furfuryl) - 2 - methyl - 4 - oxocyclopent - 2 - enyl(I) - (cis + trans)chrysanthemum - mono - carboxylate [Furethrin]
2 - Pivaloyl - indane - 1, 3 - dione [Pindon]
2 - Fluorethyl(4-bisphenyl)acetate
2-Fluoro-N-methyl-N(1-naphthyl)-acetamide
Pentachlorophenol and salts
2, 2, 2 - Trichloro - N - (pentachlorophenyl) - acetimidoyl chloride
N' - (4 - Chloro - 2 - methylphenyl) - N, N - di - methylformamidine (Chlorphenamidine)
4 - Chlorobenzyl - 4 - fluorophenyl - sulphide (Fluorobenside)
5, 6 - Dichloro - 1 - phenoxycarbanyl - 2 - trifluoromethyl - benzimidazole (Fenozaflor)
Tricyclohexyl - tin hydroxide
2 - Thiocyanatoethyl - lauric acid ester
β - Butoxy - β' - thiocyanatodiethyl - ether
Isobornyl - thiocyanatoacetate
p-Chlorophenyl - p - chlorobenzenesulphonate (Ovex)
2, 4 - Dichlorophenyl - benzenesulphonate
p - Chlorophenyl - benzenesulphonate (Fenson)
p - Chlorophenyl - 2, 4, 5 - trichlorophenylsulphone (Tetradifon)
p - Chlorophenyl - 2, 4, 5 - trichlorophenylsulphide (Tetrasul)
Methyl bromide
p - Chlorophenyl - phenylsulphone
p - Chlorobenzyl - p - chlorophenylsulphide (Chlorobenside)
4 - Chlorophenyl - 2, 4, 5 - trichlorophenylazosulphide 2(p - tert. - Butylphenoxy - 1 - methylethyl - 2 - chlorethyl - sulphite 2(p - tert. - Butylphenoxy)cyclohexyl - 2 - propinyl - sulphite 4, 4' - Dichloro - N - methylbenzenesulphonanilide N - (2 - Fluoro - 1, 1, 2, 2 - tetrachlororethylthio) - methanesulphonanilide 2 - Thio - 1,3 - dithiolo - (4, 5 - 6)quinoxaline (Thioquinox)

2 - Thio - 1, 3 - dithiolo - (4, 5 - 6)quinoxaline (Thioquinox)

Chloromethyl - p - chlorophenylsulphone (lauseto new)

1, 3, 6, 8 - Tetranitrocarbazole and

Prop - 2 - ynyl - (4 - t - butylphenoxy) - cyclohexylsulphite (Propargil).

The compounds of formula I can be manufactured in the customary manner from a O,O-dialkylthiolphosphite together with the corresponding arylsulphenic acid chloride in accordance with

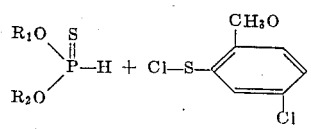

or from 2-methoxy-5-chlorophenyl-dichloro-dithiophosphate by replacing the two chlorine atoms present on the P-atom by the substituents $R_1O-$ or $R_2O-$ by reaction with the appropriate alcoholate Met $OR_1$ or successively with the alcoholates Met $OR_1$ and Met $OR_2$ in the presence of an acid acceptor. "Met" is here intended to denote an alkali metal such as Na or K.

The compounds of the present invention are, however, preferably prepared by the following process.

The present invention also provides a process for the manufacture of the new phosphoric acid esters of formula I, wherein a salt of a dithiophosphoric acid ester of the formula

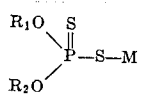

II in which $R_1$ and $R_2$, which may be the same or different, each represents a straight chain or branched alkyl radical having from 1 to 4 carbon atoms and M represents a metal atom, preferably an alkali metal atom, for example Na or K, is treated with diazotised 2-methoxy-5-chloraniline in a two-phase system at a temperature of from 10° to 100°C, preferably from 20° to 70°C.

The reaction is catalysed by copper. By a two-phase system there is herein meant an aqueous solution together with a further layer of an organic solvent, which is immiscible with water. Possible solvents of this nature are ether, chloroform, methylene chloride, ethylene chloride, petroleum ether, benzene, toluene, xylene, chlorobenzene, dichlorobenzene, nitrobenzene and others.

This reaction is generally applicable to the manufacture of O,O-dialkyl-S-aryl-dithiophosphoric acid esters.

The present invention therefore provides a general process for the manufacture of compounds of the formula

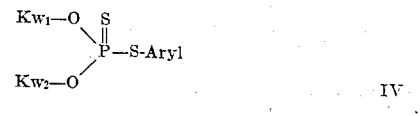

IV in which $Kw_1$ and $Kw_2$ each represent a hydrocarbon radical and Aryl represents an unsubstituted or substituted aryl radical, wherein a salt of a dithiophosphoric acid ester of the formula

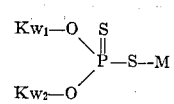

in which M represents a metal atom, preferably an alkali metal atom, for example, Na or K, is treated with a diazotised aromatic amine, which may be substituted in any desired manner, in a two-phase system of water and a water-insoluble organic component, at a temperature of from 10° to 100°C, preferably from 20° to 70°C, and preferably in the presence of copper as a catalyst.

Possible organic water-insoluble components are ether, chloroform, methylene chloride, ethylene chloride, petroleum ether, benzene, toluene, xylene, chlorobenzene, dichlorobenzene, nitrobenzene and others.

The process of the present invention is especially suitable for the manufacture of compounds of the formula V

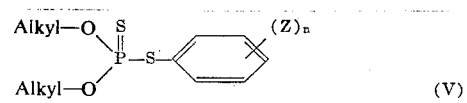

(V)

in which Alkyl and alkyl each represents a lower alkyl group having at most 4 carbon atoms, $n$ is a number from 0 to 5 and Z denotes a number, determined by $n$, of identical or different substituents from the following group: halogen, aliphat, substituted amino groups, ester, carboxylic acid, carbonamide, hydroxyl, sulphonic acid and optionally substituted sulphonamide.

Here aliphat is understood to mean hydrocarbon chains with one or more chain members containing C, which are optionally interrupted by hetero atoms, for example, O, N or S, substituted by a phenyl ring or by halogen atoms, or bonded to the phenyl nucleus of formula V via O, N or S.

Preferably, those compounds of formula V are manufactured in which $n$ represents a number from 0 to 3, with two substituents Z occupying the 2,3-, 3,4-, 3,5-, 2,4-, 2,5- or 2,6-position and three substituents preferably occupying the 2,4,5-, the 2,4,6- or the 3,4,5-position.

The following examples illustrate the invention, the parts being by weight.

EXAMPLE 1

31.5 parts of 4-chlor-2-anisidine in 200 parts by volume of water are converted into the hydrochloride with 60 parts by volume of concentrated hydrochloric acid and diazotised in the customary manner with 14 parts of sodium nitrite in 60 parts by volume of water. Thereafter nitrogen is still passed through the solution for 1 hour at 0°–2°C in order to remove nitrous gases which may be present. 50 parts by volume of chlorobenzene and a solution of 44.8 parts of the potassium salt of diethyldithiophosphoric acid and 10.6 parts of sodium carbonate in 100 parts by volume of water are then successively added, followed finally by 0.2 part of copper powder, and the mixture is warmed to 40°–50°C for 2 hours. After cooling, the aqueous phase is separated off and the organic solution is twice extracted with 50 parts by volume of 1 N sodium hydroxide solution at a time. After drying over sodium sulphate and evaporating off the solvent in vacuo at 40°–50°C bath temperature, 63 parts of the phosphoric acid ester of the following formula

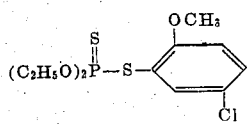

melting point from methanol, 76°–77°C are obtained. (Active substance No. 1) $LD_{50}$ p.o. 370 mg of active substance/kg of body weight (rat).

The dimethyl ester of formula

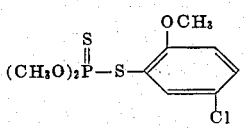

melting point 78°–79° C can be obtained analogously. (Active substance No. 2) $LD_{50}$ p.o. > 6,000 mg of active substance/kg of body weight (rat).

The following compounds can be manufactured analogously:

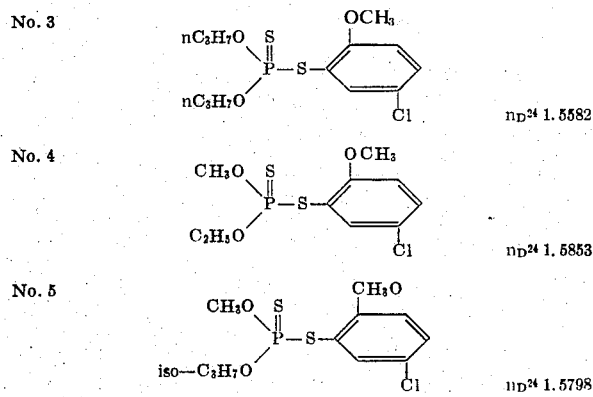

FORMULATION EXAMPLES 2 TO 5

2. DUSTING AGENTS

Equal parts of an active substance and of precipitated silica are finely ground. Dusting agents preferably containing 1–6 percent of active substance can be manufactured therefrom by mixing with kaolin or talc.

3. SPRAYING POWDERS

In order to manufacture a spraying powder which is soluble in water, the following components are mixed and finely ground:
- 50 parts of active substance according to the present invention
- 20 parts of Hisil (highly adsorbent silica)
- 25 parts of *Bolus alba* (kaolin)
- 1.5 parts of sodium 1 - benzyl - 2 - steryl - benzimidazole - 6, 3' - disulphonate and
- 3.5 parts of a reaction product of p-tert.octylphenol and ethylene oxide.

4. EMULSION CONCENTRATES a. 40 parts of an active substance of formula I are mixed with 10 parts of a mixture of an anionic surface-active compound, preferably the calcium or magnesium salt of monolauryl - benzene - monosulphonic acid and of a non-ionic surface-active compound, preferably a polyethylene glycol ether of monosorbitol-laurate, and the whole is dissolved in a little xylene. The mixture is made up to 100 ccs with xylene and a clear solution is thus obtained, which can be used as a spraying agent concentrate and which gives a stable emulsion by pouring into water.

b. Easily soluble active substances can also be formulated as an emulsion concentrate in accordance with the following instruction:

20 parts of active substance, 70 parts of xylene and 10 parts of a mixture of a reaction product of an alkylphenol with ethylene oxide and calcium dodecylbenzene sulphonate are mixed. On dilution with water to the desired concentration, a sprayable emulsion is produced.

5. GRANULES a. 7.5 g of one of the active substances of formula I are dissolved in 100 ml of acetone and the acetone solution thus obtained is added to 92 g of granular attapulgite (mesh width: 24/48 meshes/inch). The whole is well mixed and the solvent is stripped off in a rotary evaporator. Granules containing 7.5 percent of active substance are obtained.

b. In order to manufacture 10 percent strength polymer granules, 1,050 to 1,100 g of technical quality active substance of formula I are dissolved in 2 litres of trichlorethylene and sprayed in a fluidised bed granulator, under 1.5 atmospheres gauge spraying pressure, onto 9,230 g of initially introduced porous urea/HCHO granules. The solvent can again be removed by heating the fluidising air to about 50° C.

c. In order to manufacture 7.5 percent strength weighted granules, 770 g of a solid industrial quality active substance of formula I, 500 g of $BaSO_4$, 1,000 g of urea and 7,730 g of powdery porous polyacrylonitrile are pressed together on a roll mill and subsequently broken up to the desired particle size.

BIOLOGICAL EXAMPLES 6 & 7

6. ACTION AGAINST ACARINA

A. 5 adult hungry ticks (*Rhipicephalus bursa*) were counted out into a glass test tube and dipped for 1 minute into 2 ml of an aqueous solution of Compound No. 1. The test tube was closed with a standard cottonwool pad and then inverted in order to allow the solution of the active substance to be taken up by the cottonwool. The evaluation took place after 2 weeks. Complete destruction was achieved with 0.01 percent of active substance.

B. Fully gorged females of the variety *Boophilus microplus* were treated in accordance with the experimental method described under A. The evaluation took place after 4 weeks. Complete destruction was achieved with 0.02 percent of active substance of Compound No. 1.

ACTION AGAINST SPIDER MITES

Bush bean plants (*Phaseolus vulgaris*) in the two-leaf stage were infected, with spider mites 12 hours before the treatment with the active substance by placing attacked pieces of leaf from a culture on them, so that after the end of this time a population in all stages of development was present on the plant. The plants were then sprayed with the emulsified active substance with the aid of a chromatography atomiser, until a uniform deposit of droplets was produced on the surface of the leaf. Evaluation took place after 7 days: the parts of the plant were inspected under a stereo-microscope in order to calculate the destruction percentages.

The table which follows gives the destruction percentages for the normally sensitive variety *Tetranychus urticae* (Koch) and for the OP-resistant variety *Tetranychus telarius*, after treatment with Compound No. 1.

A. ACTION AGAINST TETR. URTICAE

DESTRUCTION

| Conc. [ppm] | After 2 days | | | After 7 days | |
|---|---|---|---|---|---|
| | Larvae | Adults | Eggs | Larvae | Adults |
| 800 | 100 | 100 | 80 | 100 | 100 |
| 400 | 100 | 100 | 80 | 100 | 100 |
| 200 | 100 | 100 | 60 | 80 | 100 |
| 100 | 100 | 100 | 0 | 0 | 80 |

B. ACTION AGAINST TETR. TELARIUS

DESTRUCTION

| Conc. [ppm] | After 2 days | | | After 7 days | |
|---|---|---|---|---|---|
| | Larvae | Adults | Eggs | Larvae | Adults |
| 800 | 100 | 100 | 80 | 100 | 100 |
| 400 | 100 | 100 | 80 | 80 | 100 |
| 200 | 80 | 80 | 60 | 80 | 100 |
| 100 | 60 | 0 | 0 | 0 | 80 |

7. ACTION AGAINST INSECTS

A. The action of the experimental preparations on aphids was investigated using *Aphis fabae* on *Vicia faba*. Plants which had been extensively attacked were sprayed from all sides (contact) or only sprayed from above in the direction of the axis of the shoot, so that the experimental animals sitting under the faces of the leaf were not directly struck by the spray jet (penetration). The evaluation took place after 2 days using a hand magnifying glass. If complete destruction had occurred, the plant was again infested and investigated after a further 3 days.

The destruction is given in percent:

CONTACT

| Compound No. | Conc. [ppm] | After 2 days | After 5 days | Penetration after 2 days |
|---|---|---|---|---|
| 1 | 800 | 100 | 80 | 100 |
| | 400 | 100 | 60 | 100 |
| | 200 | 100 | 60 | 60 |
| | 100 | 100 | — | 60 |
| 2 | 800 | 100 | 100 | 100 |
| | 400 | 100 | 60 | 80 |
| | 200 | 100 | — | 60 |
| | 100 | 80 | — | — |

— = not tested.

B. The test with *Epilachna varivestis*, the Mexican bean bug, was carried out as follows: 4–5 seedlings of *Phaseolus vulgaris* in the primary leaf stage, grown in a flowerpot, were dipped into emulsions of the experimental preparations and subsequently allowed to dry. The experimental animals, L-4 stages of the bug, were introduced into a conical cellophane bag, which was subsequently fastened over the treated plant by means of a rubber band. The action resulting from the treatment was determined after 5 days.

| Compound No. | Conc. [ppm] | Destruction in percent |
|---|---|---|
| 1 | 800 | 100 |
| | 400 | 100 |
| | 200 | 100 |
| 2 | 800 | 100 |
| | 400 | 80 |
| | 200 | 100 |

1. A compound of the formula

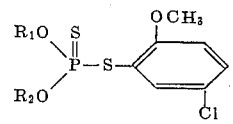

in which $R_1$ and $R_2$, which may be the same or different, each represents a straight chained or branched alkyl radical having from one to four carbon atoms.

2. The compound of the formula

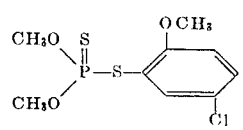

as claimed in claim 1.

3. The compound of the formula

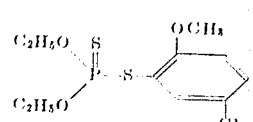

as claimed in claim 1.

* * * * *